United States Patent
Chen et al.

(10) Patent No.: US 8,117,479 B2
(45) Date of Patent: Feb. 14, 2012

(54) ELECTRONIC APPARATUS AND AUTO WAKE-UP CIRCUIT THEREOF

(75) Inventors: Chien-Sheng Chen, Hsinchu County (TW); Chih-Yuan Hsieh, Taichung County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 562 days.

(21) Appl. No.: 12/402,698

(22) Filed: Mar. 12, 2009

(65) Prior Publication Data
US 2009/0240965 A1 Sep. 24, 2009

(30) Foreign Application Priority Data
Mar. 21, 2008 (TW) .............................. 97109964 A

(51) Int. Cl.
*G06F 1/00* (2006.01)
(52) U.S. Cl. .................... 713/324; 713/323; 713/340
(58) Field of Classification Search .................. 713/300, 713/320, 323, 324, 340; 710/8, 14–19
See application file for complete search history.

(56) References Cited

U.S. PATENT DOCUMENTS

| | | | | |
|---|---|---|---|---|
| 6,000,035 A * | 12/1999 | Matsushima et al. | ......... | 713/320 |
| 6,230,277 B1 * | 5/2001 | Nakaoka et al. | ............... | 713/320 |
| 6,802,018 B2 * | 10/2004 | Bormann et al. | ............. | 713/324 |
| 7,505,795 B1 * | 3/2009 | Lim et al. | ....................... | 455/574 |
| 2002/0091956 A1 * | 7/2002 | Potter et al. | ................... | 713/324 |
| 2004/0255000 A1 * | 12/2004 | Simionescu et al. | .......... | 709/208 |
| 2005/0086550 A1 * | 4/2005 | Hammes et al. | ............... | 713/320 |
| 2005/0138470 A1 * | 6/2005 | Cromer et al. | ................... | 714/22 |
| 2006/0117198 A1 * | 6/2006 | Takasu | .......................... | 713/323 |
| 2008/0055099 A1 * | 3/2008 | Wada et al. | .................... | 340/658 |
| 2008/0148083 A1 * | 6/2008 | Pesavento et al. | ............ | 713/322 |

* cited by examiner

Primary Examiner — Thomas J Cleary
(74) Attorney, Agent, or Firm — WPAT, PC; Justin King

(57) ABSTRACT

The present invention relates to an electronic apparatus and an auto wake-up circuit thereof. The electronic apparatus comprises a main module for performing a main function of the electronic apparatus and generating a first control signal when the electronic apparatus enters a sleep mode; an auxiliary module, coupled to the main module, for performing an auxiliary function of the electronic apparatus and generating a second control signal; and a wake-up circuit module, coupled to the main module and the auxiliary module, for generating a third control signal based on the first control signal and the second control signal. The auxiliary module maintains the auxiliary function based on the third control signal while the electronic apparatus is in the sleep mode.

20 Claims, 10 Drawing Sheets

ELECTRONIC APPARATUS AND AUTO WAKE-UP CIRCUIT THEREOF

BACKGROUND OF THE INVENTION

1. Field of the Invention

The present invention relates to an electronic apparatus and an auto wake-up circuit thereof, and more particularly, to an electronic apparatus of which auxiliary functions can still be maintained while it is in a sleep mode.

2. Description of the Related Art

With rapid popularity of hand-held devices in the modern life, people can enjoy the advantages of cellular phones, personal digital assistants (PDA) or portable multimedia players (PMP), etc. Also, more and more auxiliary modules are integrated into the hand-held devices involving technologies such as Global Positioning System (GPS), radio frequency identification (RFID), and other prospective applications. A sleep mode function is generally provided in the hand-held devices such that the hand-held devices can enter the sleep mode to reduce battery power consumption at some time after operations of certain functions have been stopped. However, the operations of other essential function modules such as RF chip modules, or auxiliary modules such as GPS, RFID modules, still need to be maintained during the sleep mode.

To reduce battery power consumption, these essential function modules or auxiliary modules need not perform full functions while the system is in the sleep mode. In the conventional approach, a base-band chip or an additional watch-dog chip in a hand-held device may generate a wake-up signal in order to control the operations of the auxiliary modules. Three conventional wake-up circuits are shown exemplarily as below.

1. The wake-up signals may be generated by hand-held devices. FIG. 1 is a schematic view of a system in which the wake-up signals are generated by a hand-held device. Wherein, an RF chip 6, coupled to a base-band chip 1, is for modulating and amplifying signals of the base-band chip 1 and for transmitting the same via an antenna. Alternatively, the signals received from the antenna are demodulated to base-band signals and are further processed by the base-band chip 1. Note that the base-band chip 1 is required to generate a plurality of specific programmable hardware signals for providing wake-up signals of different time points for RF chips and auxiliary modules respectively. However, during the sleep mode, to generate such specific hardware signals is bound to increase power consumption as well as circuit design complexity.

2. The wake-up signals of RF chips are shared. FIG. 2 is a schematic diagram illustrating the sharing of wake-up signals of RF chips. A similar function can be achieved by sharing the wake-up signals of the RF chip 6. However, certain complications may arise since a timing correcting circuit 2 is needed to correct timing of the wake-up signals due to possible differences in wake-up time between the RF chip 6 and an auxiliary module 7.

3. The wake-up signals are generated by watch-dog chips. FIG. 3 is a schematic diagram of a system in which wake-up signals are generated by a watch-dog chip; a watch-dog chip 3 is added to an auxiliary module 4 in order to generate the desired signals. By this approach, while the system enters or exits the sleep mode, the base-band chip 1 only needs to generate a signal rather than sharing the wake-up signals of the RF chip 6. Thus, the wake-up signal for the auxiliary module 4 is provided by the watch-dog chip 3. Nonetheless, although this is a simple approach, extra cost for the watch-dog chip 3 is incurred and the size of printed circuit board also increases meanwhile.

Accordingly, in view of the above drawbacks, it is an imperative of the present invention to provide an improved electronic apparatus and an auto wake-up circuit thereof, so as to maintain operations of auxiliary functions of the electronic apparatus during the sleep mode, and thus to lower manufacture costs as well as to reduce hardware volume.

SUMMARY OF THE INVENTION

In view of the disadvantages of the prior art, the primary object of the present invention is to provide an electronic apparatus and an auto wake-up circuit thereof for overcoming the issues of high manufacture costs and large volume of a conventional wake-up circuit.

According to one aspect of the present invention, an electronic apparatus comprises: a main module, for performing a main function of the electronic apparatus and generating a first control signal when the electronic apparatus enters a sleep mode; an auxiliary module, coupled to the main module, for providing an auxiliary function to the electronic apparatus and generating a second control signal; and a wake-up circuit module, coupled to the main module and the auxiliary module, for generating a third control signal in accordance with the first control signal and the second control signal. Wherein, the auxiliary module maintains the auxiliary function in accordance with the third control signal while the electronic apparatus is in the sleep mode.

According to another aspect of the present invention, an auto wake-up circuit, applied to an electronic apparatus and used to maintain an operation of an auxiliary module of the electronic apparatus while the electronic apparatus is in a sleep mode, the auto wake-up circuit comprises: a power storage device; a charging unit, coupled to the power storage device, for charging the power storage device; a discharging unit, coupled to the power storage device, for providing a discharge path to the power storage device in accordance with the first control signal; and a comparing unit, coupled to the power storage device, for comparing a voltage of the power storage device with a predetermined voltage and generating the second control signal to control the operation of the auxiliary module.

Therefore, the electronic apparatus can still function properly while the electronic apparatus is in a sleep mode, and thus manufacture costs as well as hardware volume are reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

Figure 1:
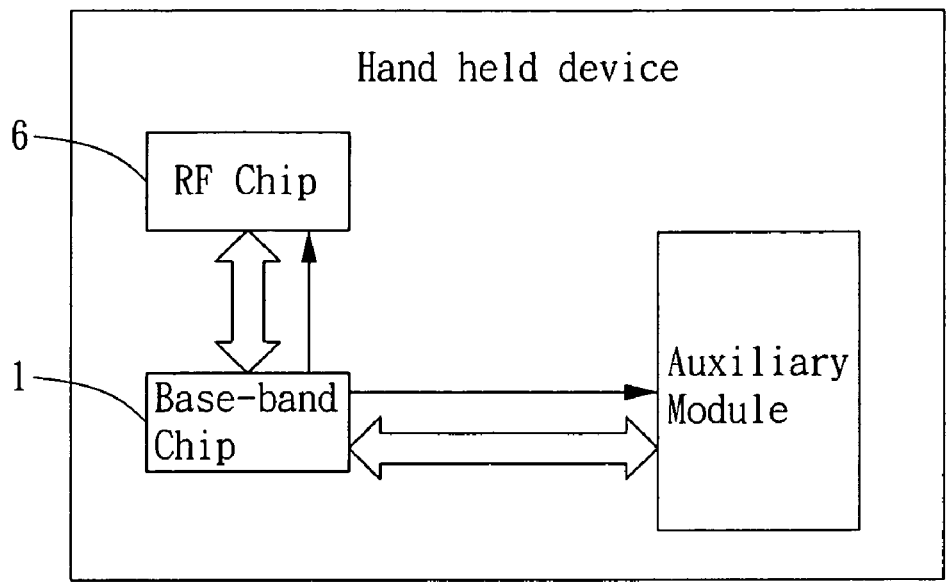
FIG. 1 is a schematic diagram of a hand-held device for generating a wake-up signal according to the present invention.
Figure 2:
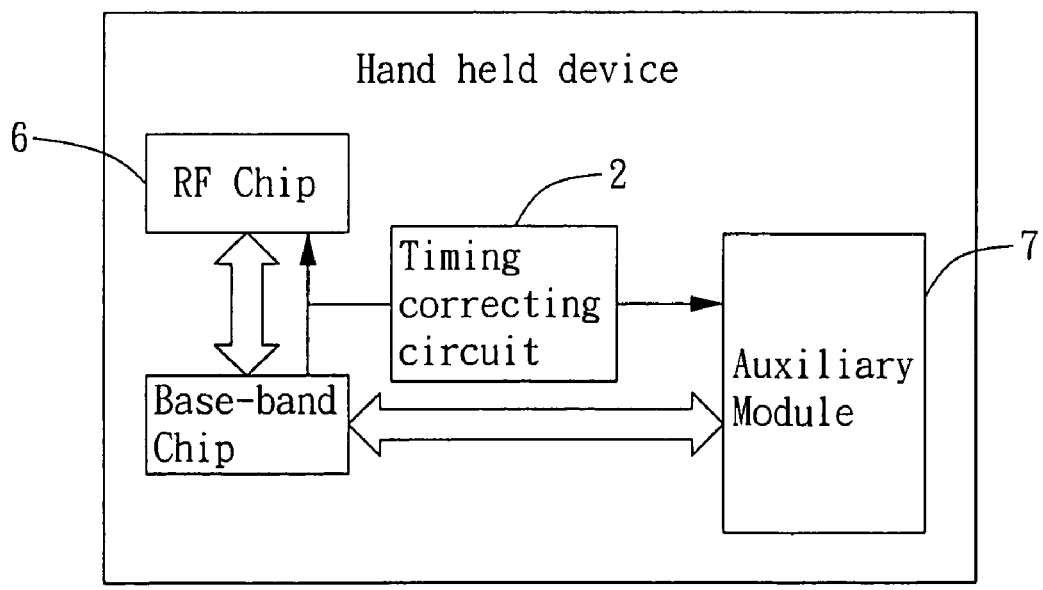
FIG. 2 is a schematic diagram of sharing GPS/RF wake-up signals according to the present invention.
Figure 3:
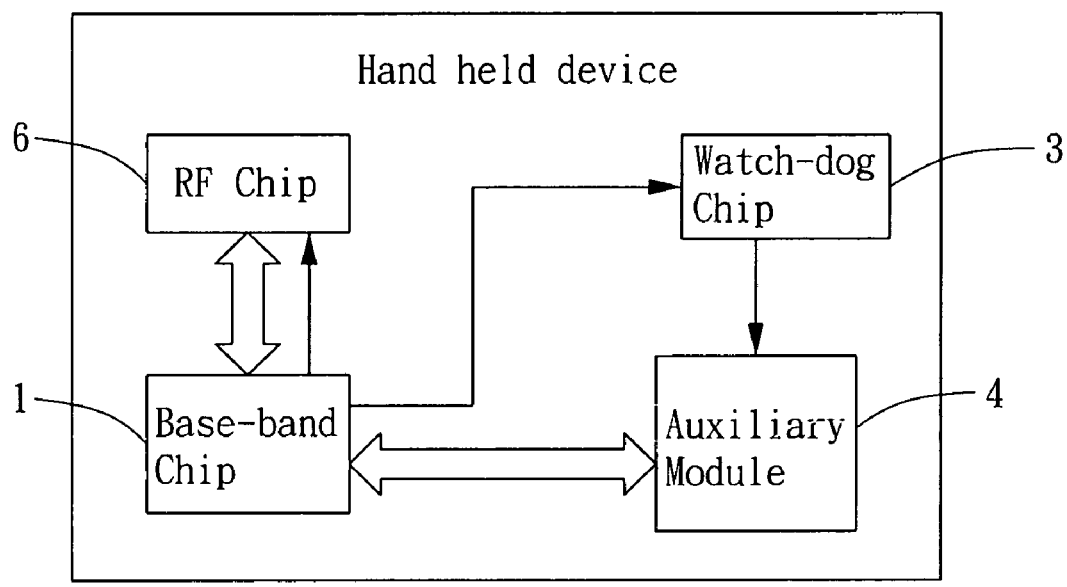
FIG. 3 is a schematic diagram of a watch-dog chip for generating a wake-up signal according to the present invention.
Figure 4:
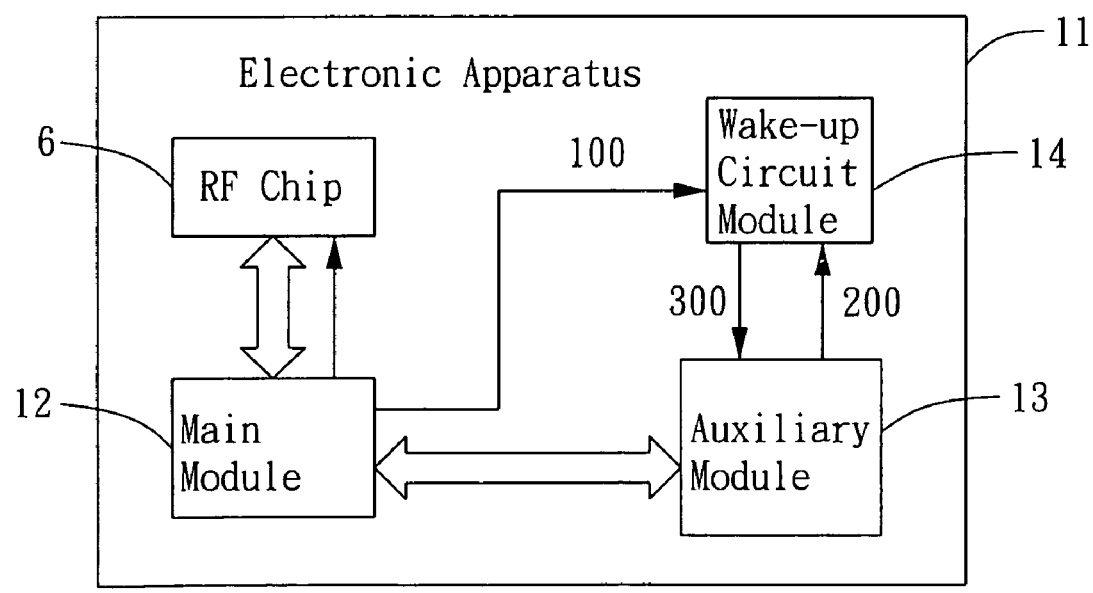
FIG. 4 is a schematic diagram of the electronic apparatus in one of the preferred embodiments according to the present invention.

FIG. 4 is a schematic diagram of an electronic apparatus having a wake-up circuit module according to one of the preferred embodiments of the present invention. An electronic apparatus 11, e.g., a cellular phone, a PDA, a GPS, or other hand-held devices, comprises: a main module 12, an auxiliary module 13, and a wake-up circuit module 14. The main module 12 performs a main function of the electronic apparatus 11. For example, if the electronic apparatus 11 is a cellular phone, the main module 12 can act as an operating circuit for handling base-band signals in the cellular phone. More specifically, while coordinating with the RF chip 6, the main module 12 may perform an essential function of the cellular phone, such as transmitting and receiving voice signals. When the electronic apparatus 11 enters the sleep mode, the main module 12 generates a first control signal 100 to be transmitted to the wake-up circuit module 14. The auxiliary module 13, coupled to the main module 12, provides the auxiliary function for the electronic apparatus 11. For instance, if the electronic apparatus 11 is a cellular phone, a GPS system or RFID may be built in the cellular phone as an auxiliary function, thus the auxiliary module 13 is a circuit performing the auxiliary function. When the electronic apparatus 11 enters the sleep mode, the auxiliary module 13 transmits a second control signal 200 to the wake-up circuit module 14 upon request. The wake-up circuit module 14 is coupled to the main module 12 and the auxiliary module 13. As aforementioned, when the electronic apparatus 11 enters the sleep mode, the main module 12 generates a first control signal 100 to be transmitted to the wake-up circuit module 14 and the auxiliary module 13 transmits the second control signal 200 to the wake-up circuit module 14 upon request.

When being about to enter a power descending mode, the auxiliary module 13 transmits the second control signal 200 to the wake-up circuit module 14, such that the auxiliary module 13 shall be automatically waken up after a predetermined time period. At this point, the wake-up circuit module 14 generates a third control signal 300 in accordance with the first control signal 100 and the second control signal 200, and transmits the same to the auxiliary module 13 to maintain normal operations of the auxiliary function.

Figure 5:
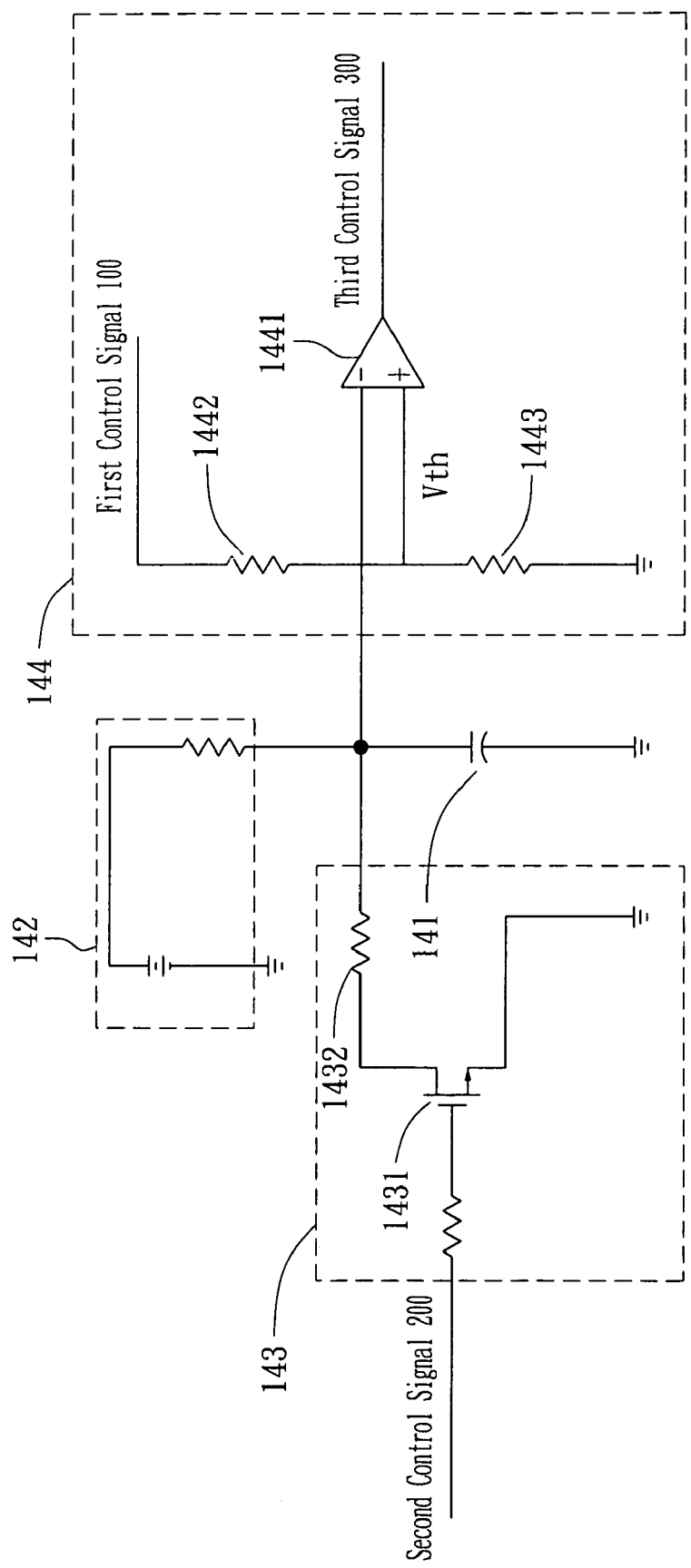
FIG. 5 is a circuit diagram of a wake-up circuit module in one of the preferred embodiments according to the present invention.

The circuit configuration of the wake-up circuit module 14 may be realized according to the different design methodologies. FIG. 5 readily illustrates one of the embodiments. The wake-up circuit module 14 comprises a power storage device 141, a charging unit 142, a discharging unit 143, and a comparing unit 144. The power storage device 141, capable of storing electric charges and generating a voltage, may be implemented by a capacitor in actual practice. The charging unit 142 comprises a resistor and a voltage supply serially connected with the power storage device 141 and provides a charging path for charging the power storage device 141. The discharging unit 143 is mainly implemented by a switch device 1431 and a resistor 1432. The on-and-off state of the switch device 1431 is controlled by the second output signal 200 outputted from the auxiliary module 13. When the switch device 1431 is switched on, the power storage device 141, the resistor 1432 and the switch device 1431 form a closed loop to discharge the power storage device 141. The comparing unit 144 principally comprises an operational amplifier 1441, wherein the inverting input terminal of the operational amplifier 1441 receives the voltage on the power storage device 141, and the non-inverting input terminal of the operational amplifier 1441 receives a predetermined voltage $V_{th}$. The predetermined voltage $V_{th}$ is generated by dividing the first control signal 100 outputted from the main module 12 using serially connected resistors 1442 and 1443.

Figure 7:
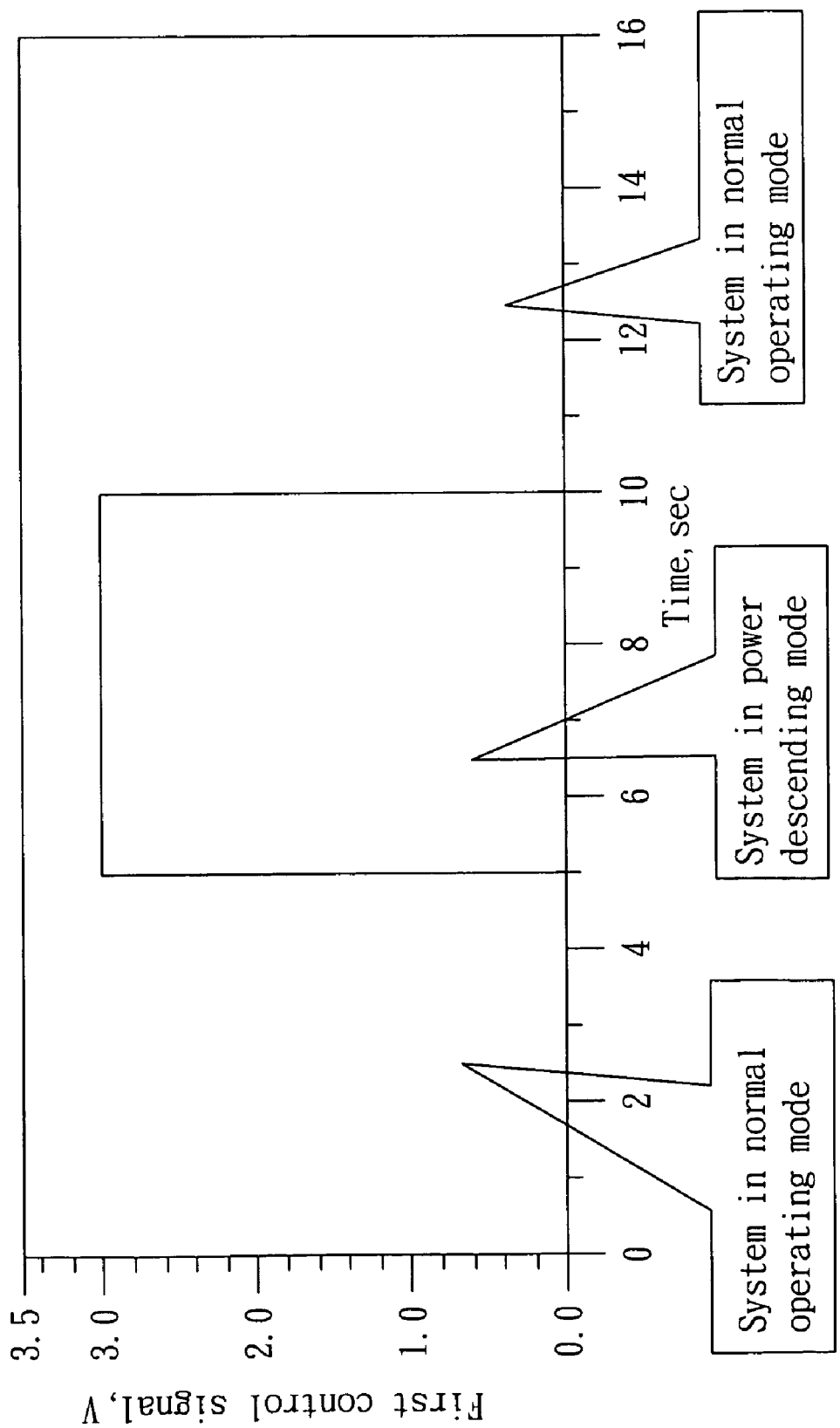
FIG. 7 is a voltage waveform timing diagram of the first control signal according to the preferred embodiment in FIG. 5.

Refer to FIG. 7 showing a waveform of the first control signal 100. When the electronic apparatus 11 enters a power descending mode, namely, the sleep mode, from a normal operating mode (the $5^{th}$ second at the time axis in FIG. 7), the main module 12 generates the first control signal 100. Alternatively, under the normal operating mode, the main module 12 generates the first control signal 100 at 0 volt, which is increased to 3 volts during the power descending mode. Thus in the power descending mode, the non-inverting terminal of the operational amplifier 1441 of FIG. 5 receives the predetermined voltage $V_{th}$. The predetermined voltage $V_{th}$ is directly proportional to the first control signal 100, which is generated by the division of the resistors.

Figure 8:
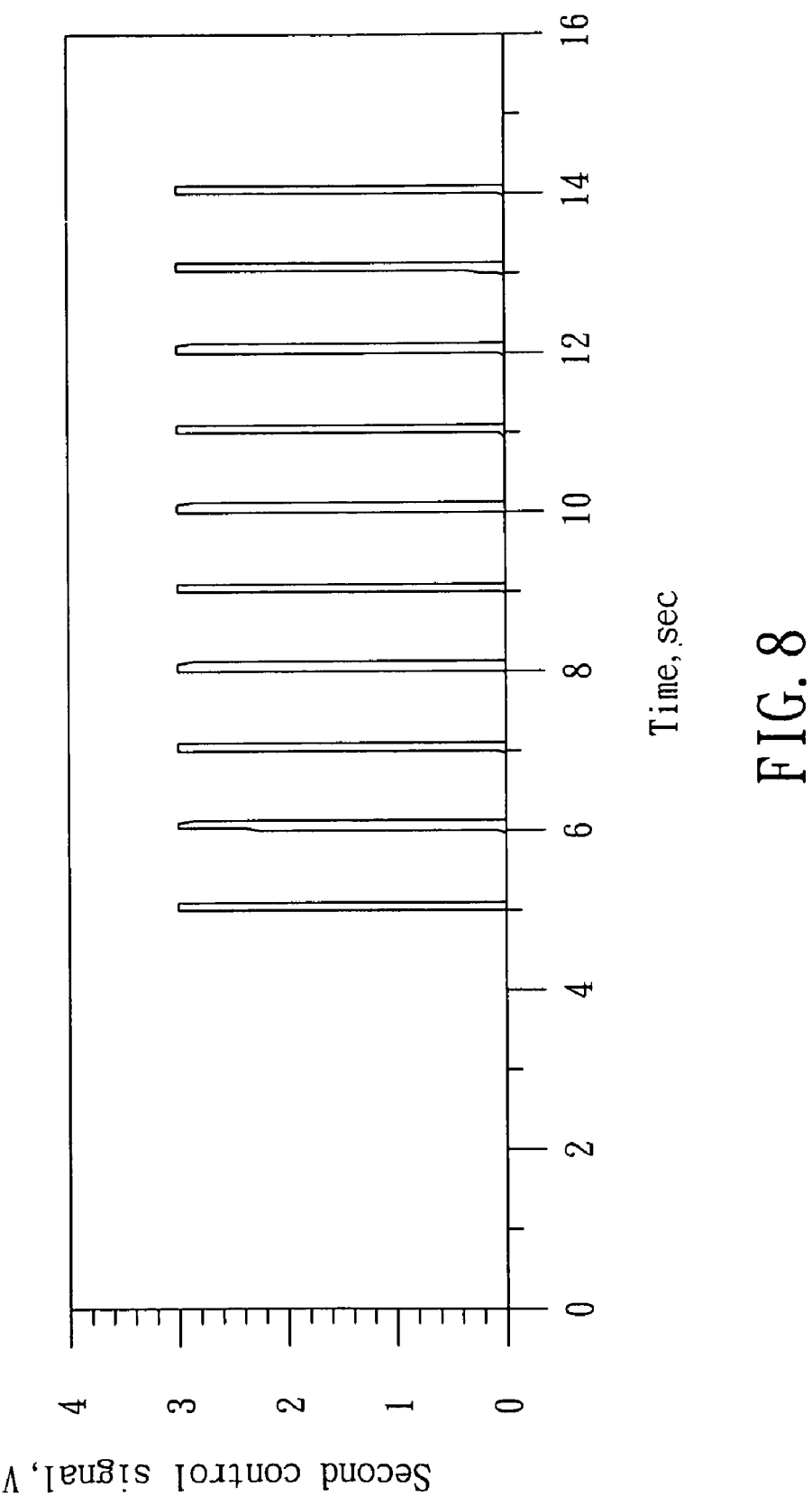
FIG. 8 is a voltage waveform timing diagram of the second control signal according to the preferred embodiment in FIG. 5.

Refer to FIG. 8 showing a waveform of the second control signal 200. When the electronic apparatus 11 enters a power descending mode from a normal operating mode (the $5^{th}$ second), the auxiliary module 13 generates the second control signal 200 upon request. From FIG. 8, it can be understood that the second control signal 200 may be a pulse signal having fixed intervals, and the switch device 1431 is manipulated by the second control signal 200 to be switched on or off. In the present embodiment, the switch device 1431 is an N-MOSFET. Thus, when the pulse signal is generated, the switch device 1431 is switched on and the power storage device 141 discharges via the resistor 1432.

Figure 9:
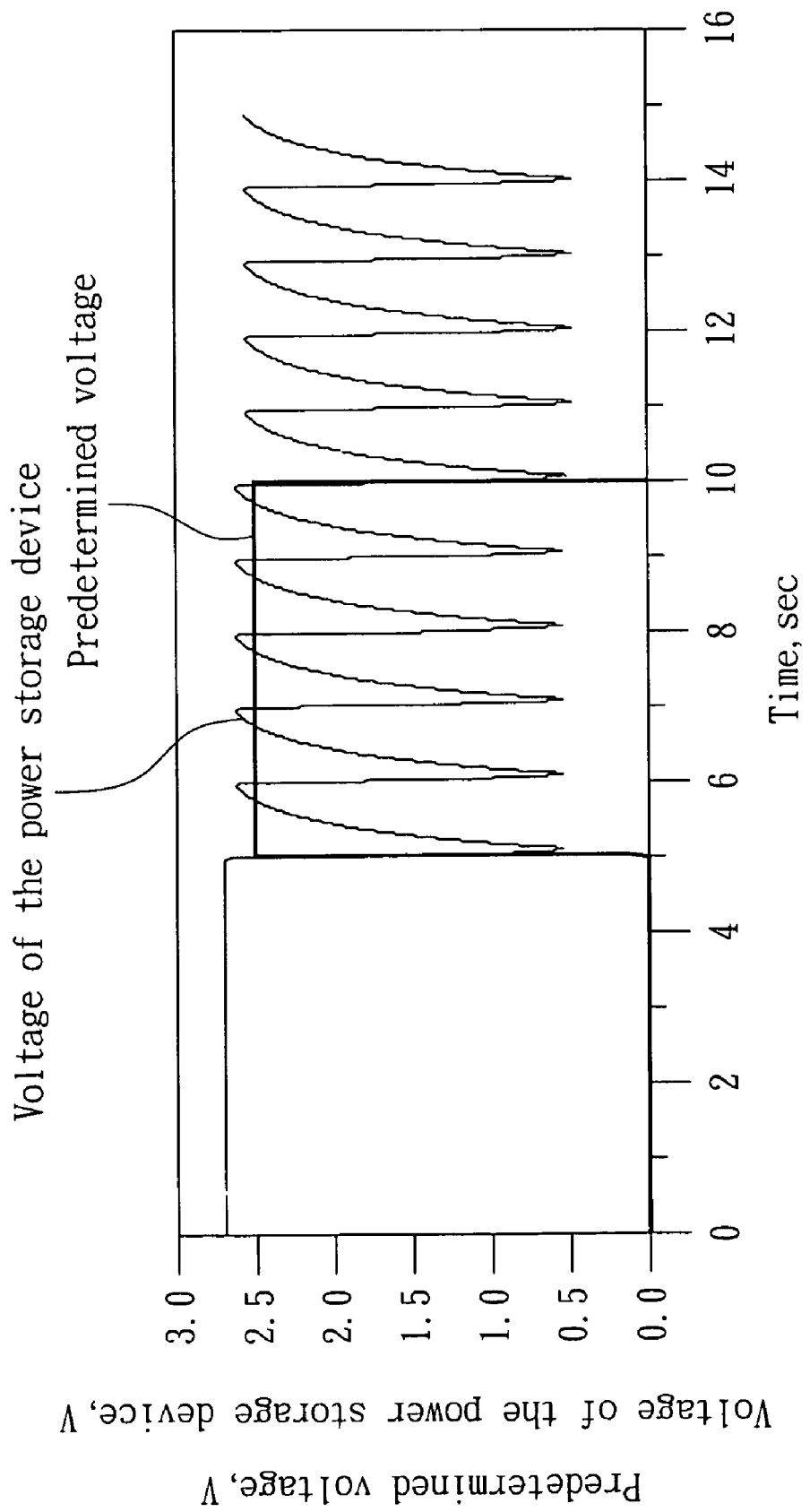
FIG. 9 is a voltage waveform timing diagram of the voltage of the power storage device versus the predetermined voltage according to the preferred embodiment in FIG. 5.

Refer to FIG. 9 showing waveforms of the voltage of the power storage device 141 and the predetermined voltage $V_{th}$. Before the electronic apparatus 11 enters the power descending mode (the $5^{th}$ second), the power storage device 141 is in a fully charged state, meaning that the voltage of the power storage device 141 is a constant value. Meanwhile, the voltage of the first control signal 100 is 0 volt or may be regarded as not having been generated yet, and therefore the predetermined $V_{th}$ is also 0 volt. At the $5^{th}$ second, the switch device 1431 is transiently switched on due to the trigger of the pulse of the second control signal 200, in such a way that the power storage device 141 starts discharging and the voltage of the power storage device 141 descends. The discharging speed is correlated with capacitance of the power storage device 141 and resistance of the resistor 1432, and thus the capacitance of the power storage device 141 and the resistance of the resistor 1432 can be tuned to adjust the discharging speed. Correspondingly, the second control signal 200 returns to a low voltage level to turn the switch device 1431 back to the off state. At this point, the power storage device 141 is charged by the charging unit 142, and the voltage of the device 141 starts to rise again. Also, the capacitance of the power storage device 141 and the resistance of the resistor in the charging unit 142 may be tuned to adjust the charging speed. Because the second control signal 200 is a periodical pulse signal, the voltage of the power storage device 141 is also periodical.

Figure 10:
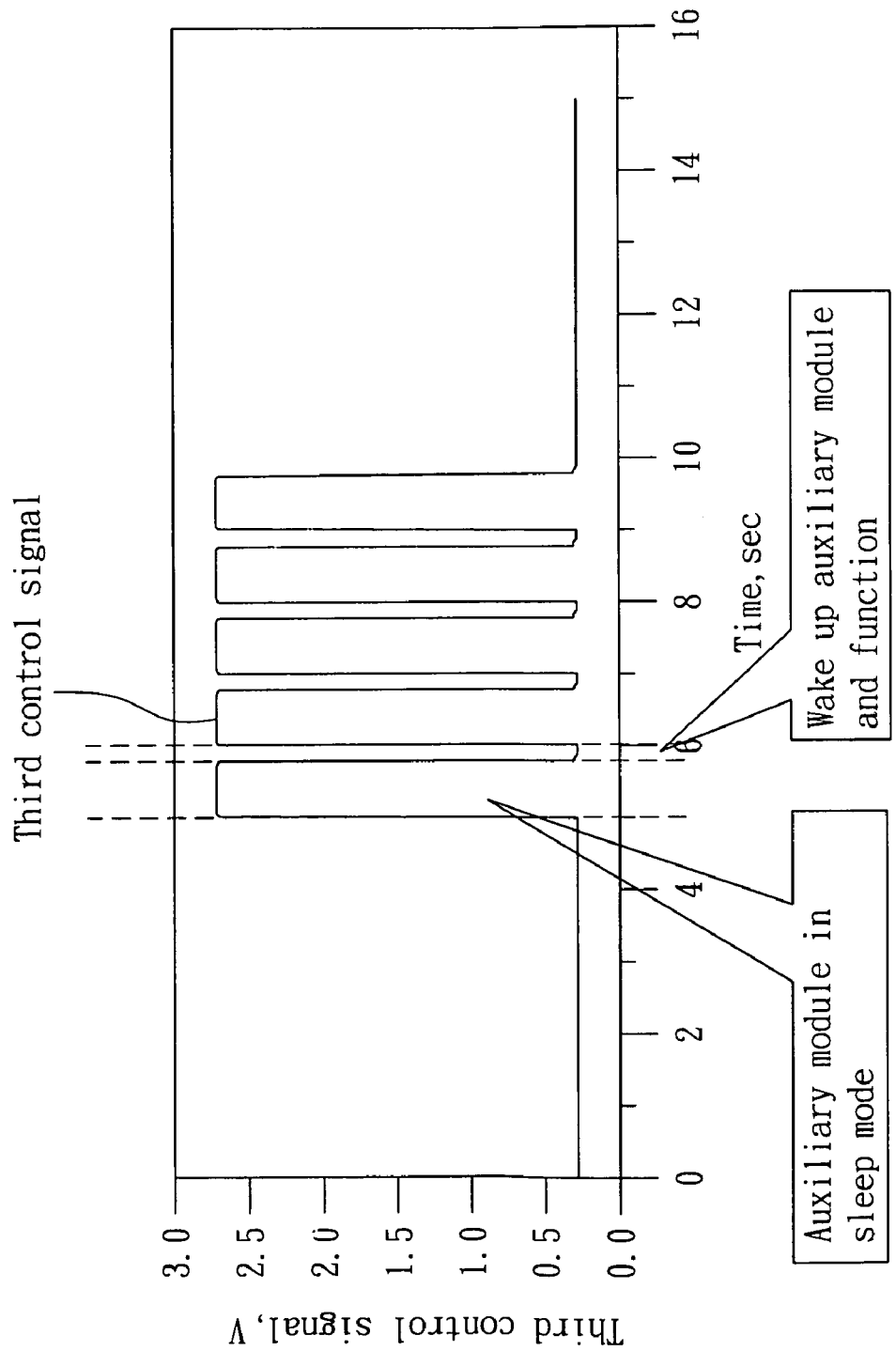
FIG. 10 is a voltage waveform timing diagram of the third control signal according to the preferred embodiment in FIG. 5.

A comparing unit 144 compares the voltage of the power storage device 141 with the predetermined voltage $V_{th}$ and outputs a third control signal 300, the waveform of which is illustrated in FIG. 10. When the voltage of the power storage device 141 is lower than the predetermined voltage $V_{th}$, the third control signal 300 is at a high level, e.g., slightly higher than 2.5 volts in this example. When the voltage of the power storage device 141 is higher than the predetermined voltage $V_{th}$, the third control signal 300 is at a low level, e.g., slightly lower than 0.5 volt in this example. According to the present embodiment, the auxiliary module 13 enters the sleep mode when the third control signal is at a high level. Hence, in one cycle of the second control signal 200, the auxiliary module 13 is waken up once, and its operating duration is the duration that the third control signal 300 stays at a low level at the $5^{th}$ second. As a result, the operating period of the auxiliary module 13 approximates or equals to that of the second control signal 200. Note that the auxiliary module 13 still generates the second control signal 200 (in FIG. 8) while the system returns to the normal operating mode from the power descending mode (i.e., after $10^{th}$ second) and the power storage device 141 charges and discharges accordingly (in FIG. 9). However, after the $10^{th}$ second, the third control signal remains unaffected and keeps on staying at a low level (in FIG. 10) to facilitate the auxiliary module 13 to function normally. More specifically, the second control signal 200 generated by the auxiliary module 13 does not affect the normal operations of the system when the system is under the normal operating mode. At this point, the pin for generating the second control signal 200 may be used to serve other purposes.

Figure 6:
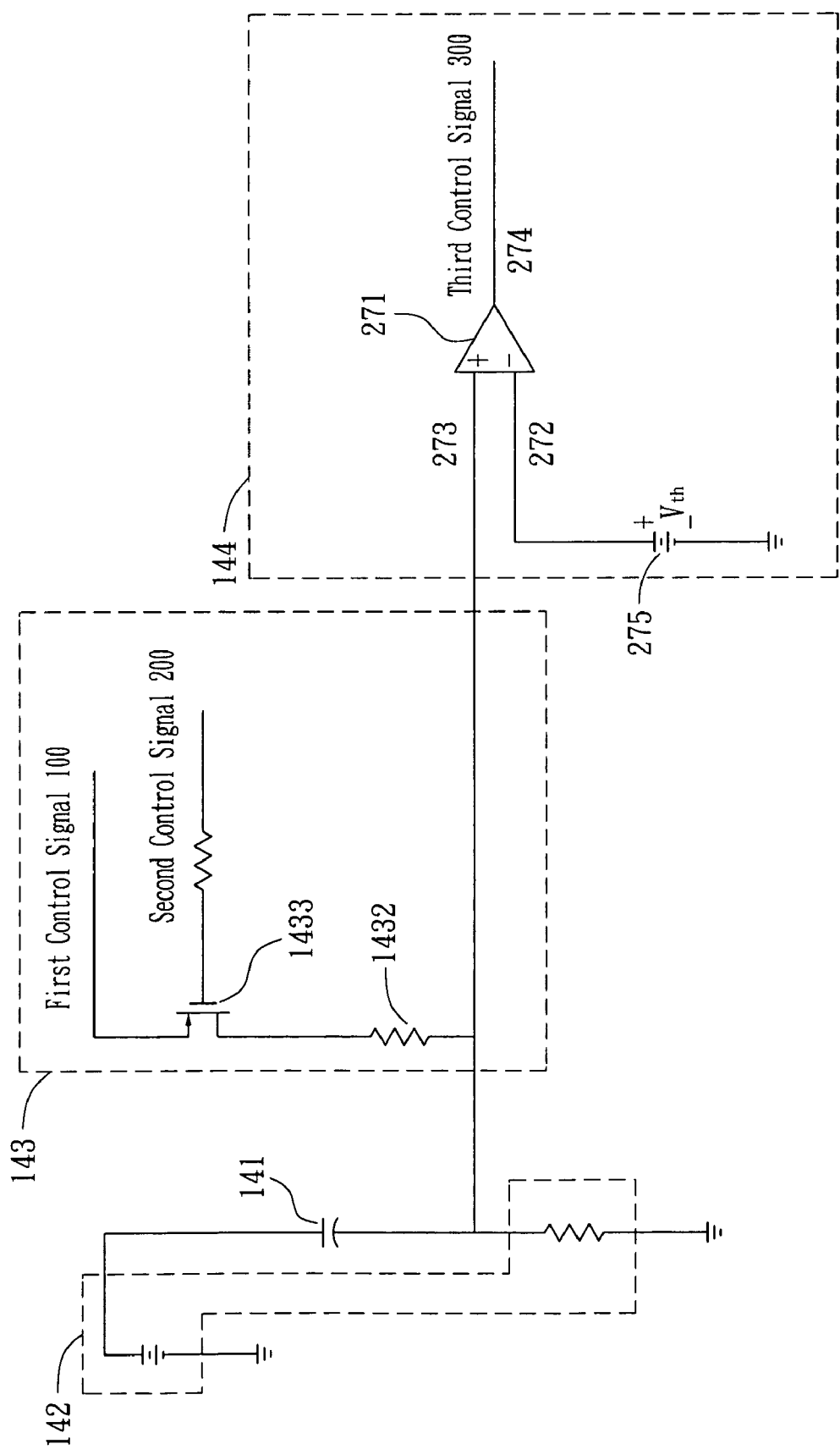
FIG. 6 is a circuit diagram of a wake-up circuit module in another one of the preferred embodiments according to the present invention.

FIG. 6 illustrates another exemplary embodiment of the circuit configuration of the wake-up circuit module 14. As discussed previously, the wake-up circuit module 14 comprises the power storage device 141, the charging unit 142, the discharging unit 143, and the comparing unit 144. The power storage device 141, capable of storing electric charges and generating a voltage, can be implemented by a capacitor. The charging unit 142 comprises a resistor and a voltage supply serially connected with the power storage device 141 to provide a charging path to charge the power storage device 141. The discharging unit 143 is principally implemented by a switch device 1433 and a resistor 1432. The on-and-off state of the switch device 1433 is manipulated by the second control signal 200 outputted from the auxiliary module 13. When the switch device 1433 is switched on, the power storage device 141, the resistor 1432, and the switch device 1433 form a closed loop to enable the power storage device 141 to discharge, and the first control signal 100 is associated with the voltage level of the discharging path. The comparing unit 144 principally comprises an operational amplifier 271, wherein an inverting input terminal 272 of the operational amplifier 271 receives a predetermined voltage $V_{th}$, and a non-inverting input terminal 273 of the operational amplifier 271 receives the voltage on the power storage device 141. The predetermined voltage $V_{th}$ is generated by a voltage supply 275.

Figure 11:
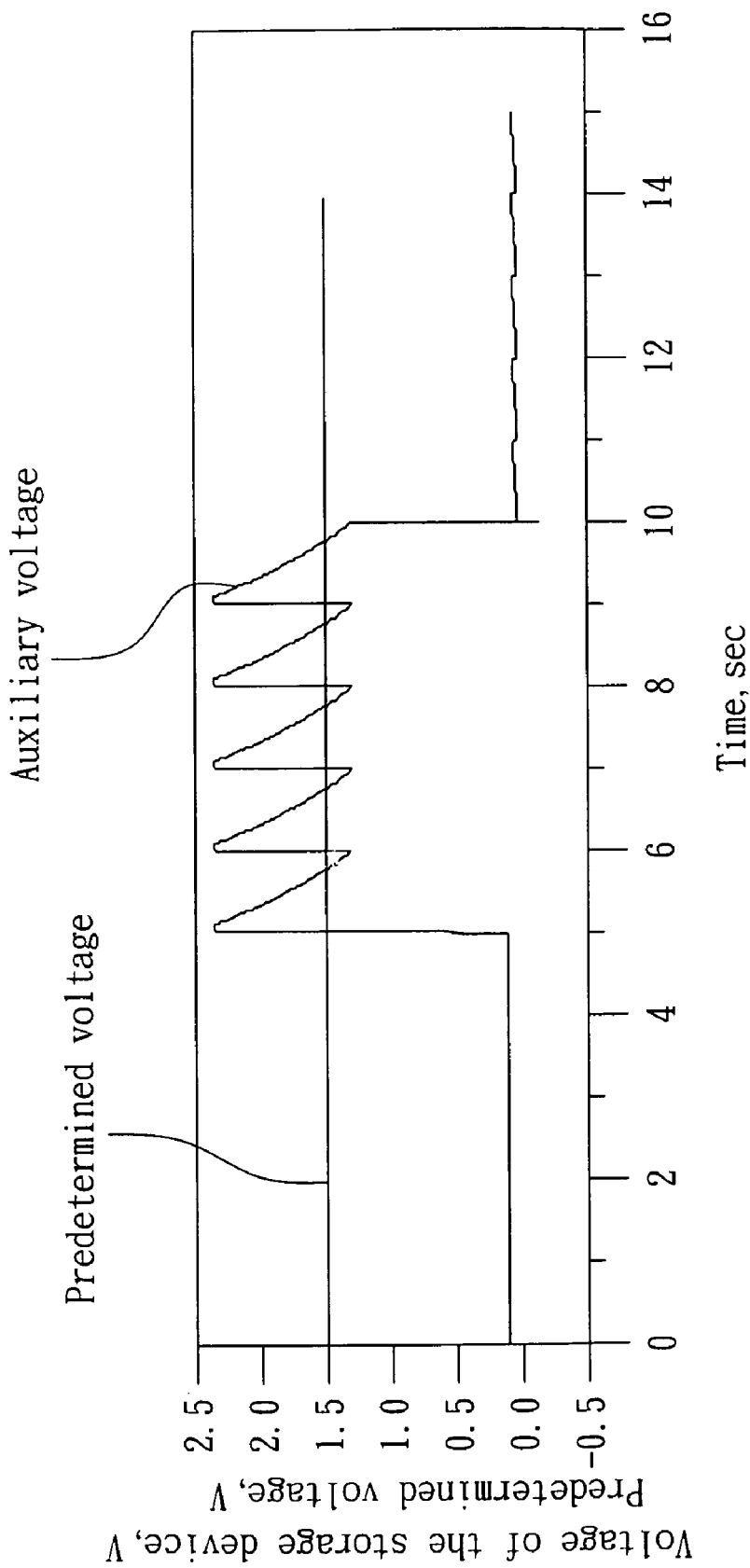
FIG. 11 is a voltage waveform timing diagram of the voltage of the power storage device versus the predetermined voltage according to the preferred embodiment in FIG. 6.

The major difference between the embodiments illustrated in FIG. 5 and FIG. 6 is that, the switch device 1433 in FIG. 6 is a P-MOSFET. Therefore, when the pulse signal in FIG. 8 is generated, the switch device 1433 is switched off, and the power storage device 141 is charged by the charging unit 142 at this point. Accordingly, before the electronic apparatus 11 enters the power descending mode from the normal operating mode, that is, before the second control signal 200 is generated, the power storage device 141 is in an exhausted state due to the influence of the discharging path, such that the voltage of the power storage device 141 stays constant at a low voltage level (in FIG. 11). At the $5^{th}$ second, the switch device 1433 is transiently switched off due to the pulse of the second control signal 200 to enable the power storage device 141 to be charged via the charging path so that the voltage of the power storage device 141 transiently rises. The charging speed is correlated with the capacitance of the power storage device 141 and the resistance of the resistor in the charging unit 142. Accordingly, the second control signal 200 returns to the low voltage level to switch on the switch device 1433 again. At this point, being affected by the discharging unit 143, the power storage device 141 discharges, with its voltage starting to descend again. The discharging speed can be also tuned by the capacitance of the power storage device 141 and the resistance of the resistor 1432. Since the second control signal 200 is a periodical pulse, the voltage of the power storage device 141 presents periodical too. Meanwhile, the voltage of the voltage supply 275 is set to be 1.5 volts, and thus the predetermined voltage $V_{th}$ becomes 1.5 volts as well.

Figure 12:
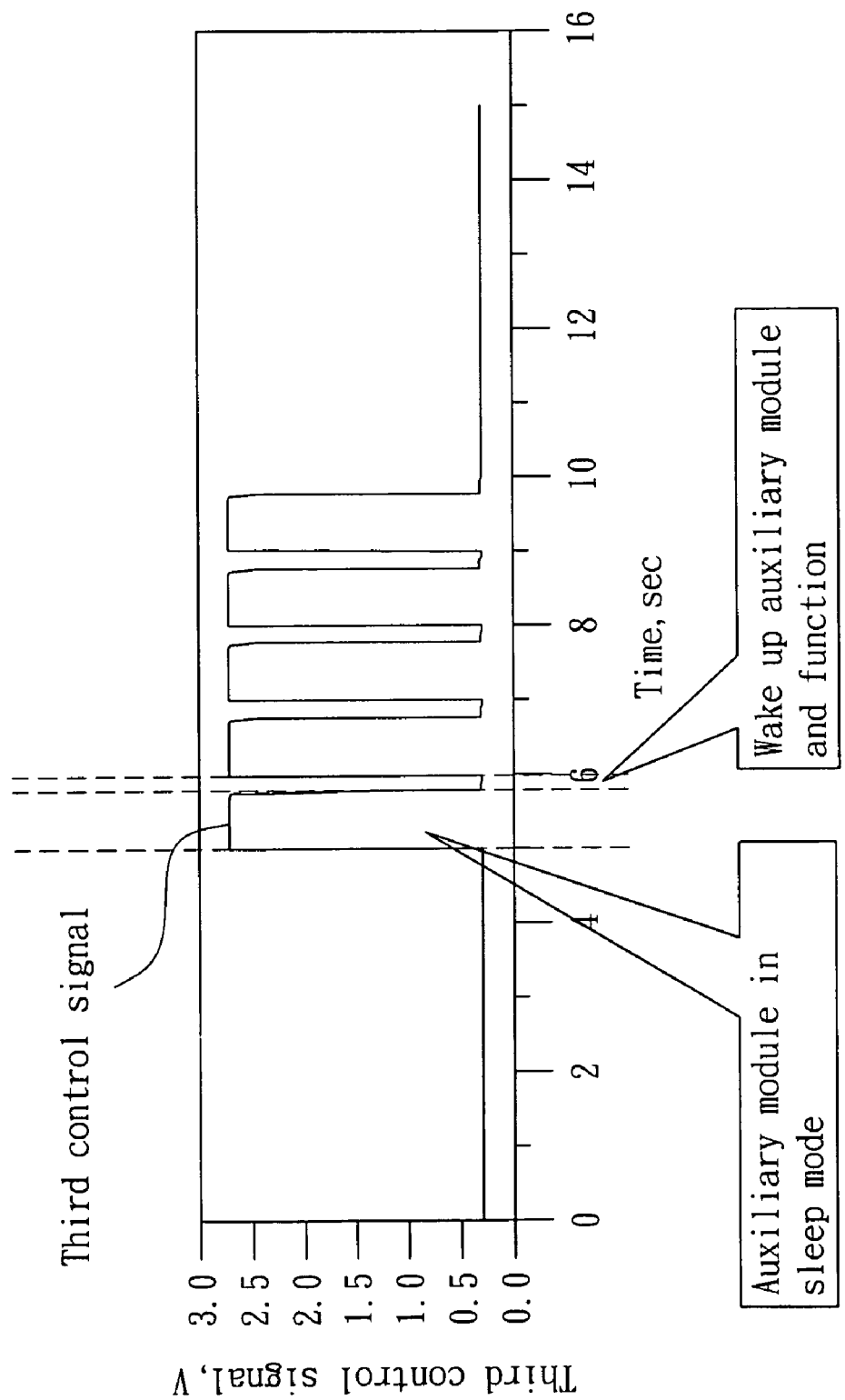
FIG. 12 is a voltage waveform timing diagram of the third control signal according to the preferred embodiment in FIG. 6.

The operational amplifier 271 compares the voltage of the power storage device 141 with the predetermined voltage $V_{th}$, and then outputs a third control signal 300, the waveform of which is shown in FIG. 12. When the voltage of the power storage device 141 is higher than the predetermined voltage $V_{th}$, the third control signal 300 is at a high level, e.g., slightly higher than 2.5 volts in this example. When the voltage of the power storage device 141 is lower than the predetermined voltage $V_{th}$, the third control signal 300 is at a low level, e.g., slightly lower than 0.5 volt in this example. In the present embodiment, the auxiliary module 13 enters the sleep mode when the third control signal 300 is at a high level. Hence, within one cycle of the second control signal 200, the auxiliary module 13 is waken up once, and its operating duration is the duration that the third control signal 300 stays at a low level at the $5^{th}$ second as depicted in FIG. 12. Therefore, the operating period of the auxiliary module 13 approximates or equals to the period of the second control signal 200. What is identical to the embodiment illustrated in FIG. 5 is, although the auxiliary module 13 keeps on generating the second control signal 200 (in FIG. 8) when the system returns to the normal operating mode from the power descending mode (namely after the $10^{th}$ second), however, the third control signal after the $10^{th}$ second remains unaffected and keeps staying at a low level (in FIG. 12) to facilitate the auxiliary module 13 to function normally. More specifically, when the system functions under the normal operating mode, the second control signal 200 generated by the auxiliary module 13 does not affect the normal operations of the system. At this point, the pin for generating the second control signal 200 may be used to serve other purposes.

The foregoing descriptions are of exemplary embodiments only, and are not intended to limit the scope, applicability, or configuration of the invention in any way. Rather, the following description provides a convenient illustration for implementing exemplary embodiments of the invention. Various changes such as circuit structures and voltage waveforms to the described embodiments may be made in the function and arrangement of the elements described.

From the above disclosure, according the present invention, when the electronic apparatus enters the sleep mode, the electronic apparatus can be still in operation and possesses advantages over the prior arts as follows:

1. Manufacture costs and hardware volumes are reduced.
2. The operating duration of the auxiliary module may be adjusted by merely tuning the predetermined voltage $V_{th}$ and the associated resistance/capacitance.
3. When the system enters the sleep mode, the auto wake-up circuit remains functioning. Therefore, when the system is waken up, the auxiliary module resumes the normal operating mode.

Therefore, an electronic apparatus and the auto wake-up circuit according to the present invention are capable of maintaining normal operations while the electronic apparatus is in the sleep mode, thereby achieving the goal of reducing the manufacture cost as well as hardware volume.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An electronic apparatus, comprising:
    a main module, for performing a main function of the electronic apparatus, and generating a first control signal when the electronic apparatus enters a sleep mode;
    an auxiliary module, coupled to the main module, for providing an auxiliary function to the electronic apparatus, and generating a second control signal; and
    a wake-up circuit module, coupled to the main module and the auxiliary module, for generating a third control signal in accordance with the first control signal and the second control signal;
    wherein, the auxiliary module maintains the auxiliary function in accordance with the third control signal in the sleep mode.

2. The electronic apparatus of claim 1, wherein the electronic apparatus is a hand-held electronic device.

3. The electronic apparatus of claim 1, wherein the auxiliary module is an RFID module or a GPS module.

4. The electronic apparatus of claim 1, wherein the second control signal is a pulse signal.

5. The electronic apparatus of claim 4, wherein the period of the pulse signal equals to or approximates the period according to which the auxiliary module maintains the auxiliary function.

6. The electronic apparatus of claim 1, wherein the control signal is generated when the electronic apparatus enters the sleep mode.

7. The electronic apparatus of claim 1, wherein the wake-up circuit module comprises:
    a power storage device;
    a charging unit, coupled to the power storage device, for charging the power storage device;
    a discharging unit, coupled to the power storage device, for providing a discharge path to the power storage device in accordance with the second control signal; and
    a comparing unit, coupled to the power storage device, for comparing a voltage of the power storage device with a predetermined voltage to generate the third control signal.

8. The electronic apparatus of claim 7, wherein the comparing unit is further coupled to the main module, and the predetermined voltage is generated in accordance with the first control signal.

9. The electronic apparatus of claim 7, wherein the discharging unit is further coupled to the main module, and the discharging path is associated with a level of the first control signal.

10. The electronic apparatus of claim 7, wherein the discharging unit comprises a switch device, and an on-and-off state of the switch device is controlled by the second control signal.

11. An auto wake-up circuit, applied to an electronic apparatus and used to maintain an operation of an auxiliary module of the electronic apparatus while the electronic apparatus is in a sleep mode, the auto wake-up circuit comprising:
    a power storage device;
    a charging unit, coupled to the power storage device, for charging the power storage device;
    a discharging unit, coupled to the power storage device, for providing a discharge path for the power storage device in accordance with a first control signal; and
    a comparing unit, coupled to the power storage device, for generating a second control signal by comparing a voltage of the power storage device with a predetermined voltage, in order to control the operation of the auxiliary module.

12. The auto wake-up circuit of claim 11, wherein the first control signal is generated by the auxiliary module when the electronic apparatus enters the sleep mode.

13. The auto wake-up circuit of claim 11, wherein a third control signal is generated by the electronic apparatus in the sleep mode and the predetermined voltage is generated according to the third control signal.

14. The auto wake-up circuit of claim 11, wherein a third control signal is generated by the electronic apparatus in the sleep mode and the discharging path is associated with a level of the third control signal.

15. The auto wake-up circuit of claim 11, wherein the first control signal is a pulse signal.

16. The auto wake-up circuit of claim 15, wherein the period of the pulse signal equals to or approximates the period according to which the auxiliary module operates in the sleep mode.

17. The auto wake-up circuit of claim 11, wherein the power storage device is a capacitor.

18. The auto wake-up circuit of claim 11, wherein the discharging unit comprises a switch device, and an on-and-off state of the switch device is controlled by the first control signal.

19. The auto wake-up circuit of claim 18, wherein the switch device is a transistor.

20. The auto wake-up circuit of claim 11, wherein the comparing unit comprises an operational amplifier, which has a first input terminal coupled to the predetermined voltage, a second input terminal coupled to the power storage device, and an output terminal outputting the second control signal.

* * * * *